US012656487B2

(12) United States Patent
Sasaki et al.

(10) Patent No.: US 12,656,487 B2
(45) Date of Patent: Jun. 16, 2026

(54) OBJECT DETECTION SYSTEM

(71) Applicant: Murata Manufacturing Co., Ltd., Nagaokakyo (JP)

(72) Inventors: Shinichi Sasaki, Nagaokakyo (JP); Takaaki Asada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 306 days.

(21) Appl. No.: 18/226,290

(22) Filed: Jul. 26, 2023

(65) Prior Publication Data

US 2023/0367007 A1 Nov. 16, 2023

Related U.S. Application Data

(63) Continuation of application No. PCT/JP2021/037868, filed on Oct. 13, 2021.

(30) Foreign Application Priority Data

Mar. 3, 2021 (JP) ................................. 2021-033499

(51) Int. Cl.
 *G01S 7/527* (2006.01)
 *G01S 15/10* (2006.01)
(52) U.S. Cl.
 CPC ............ *G01S 15/101* (2013.01); *G01S 7/527* (2013.01)
(58) Field of Classification Search
 CPC ........ G01S 15/101; G01S 7/524; G01S 7/527; G01S 15/931; G01S 7/526; B06B 1/02
 See application file for complete search history.

(56) References Cited

U.S. PATENT DOCUMENTS

| | | | | |
|---|---|---|---|---|
| 5,020,411 A | * | 6/1991 | Rowan | .................... F03H 99/00 89/8 |
| 6,680,603 B1 | * | 1/2004 | Klaus-Manfred | ..... H02M 3/158 363/124 |

(Continued)

FOREIGN PATENT DOCUMENTS

| | | |
|---|---|---|
| CN | 1989418 A | 6/2007 |
| CN | 104076364 A | 10/2014 |

(Continued)

OTHER PUBLICATIONS

International Search Report in PCT/JP2021/037868, mailed Dec. 28, 2021, 5 pages.

(Continued)

*Primary Examiner* — Abdallah Abulaban
*Assistant Examiner* — Amie M Ndure
(74) *Attorney, Agent, or Firm* — Keating & Bennett, LLP

(57) ABSTRACT

An object detection system includes an acoustic wave generator to generate an acoustic wave by generating heat upon energization and a processing circuit to perform object detection processing to detect an object in target space using an acoustic wave generated by the acoustic wave generator. The object detection processing includes setting processing, wave transmission processing, and determination processing. The setting processing sets a search range corresponding to a distance to the object in the target space. The wave transmission processing controls the acoustic wave generator to generate an acoustic wave at a target sound pressure associated with a search range set in the setting processing. The determination processing acquires, from a wave receiver to receive an acoustic wave from the target space, a received-wave signal representing an acoustic wave received by the wave receiver and determines whether the object is present based on the received-wave signal.

20 Claims, 8 Drawing Sheets

(56) References Cited

U.S. PATENT DOCUMENTS

| | | | | |
|---|---|---|---|---|
| 7,104,131 B2 * | 9/2006 | Taylor | ................. | G01N 29/341 |
| | | | | 73/620 |
| 7,977,820 B2 * | 7/2011 | Chu | ........................ | H03K 3/64 |
| | | | | 307/106 |
| 9,635,468 B2 * | 4/2017 | Aliev | ................. | H04R 23/002 |
| 2005/0204819 A1 * | 9/2005 | Taylor | ............... | G01N 29/2468 |
| | | | | 73/642 |
| 2008/0291784 A1 | 11/2008 | Yamanaka et al. | | |
| 2009/0206676 A1 * | 8/2009 | Chu | ..................... | B06B 1/0215 |
| | | | | 307/106 |
| 2016/0037267 A1 * | 2/2016 | Aliev | .................. | H04R 23/002 |
| | | | | 977/932 |
| 2022/0155440 A1 * | 5/2022 | Kruse | ................. | A61B 8/5207 |

FOREIGN PATENT DOCUMENTS

| | | | |
|---|---|---|---|
| JP | 57206869 A | | 12/1982 |
| JP | 2014232069 A | | 12/2014 |
| JP | 2016090433 A | * | 5/2016 |
| JP | 2017181157 A | | 10/2017 |
| JP | 2018105703 A | | 7/2018 |

OTHER PUBLICATIONS

Written Opinion in PCT/JP2021/037868, mailed Dec. 28, 2021, 6 pages.
Official Communication issued in corresponding Chinese Patent Application No. 202180090959.7, mailed on Sep. 27, 2025, 7 pages.

\* cited by examiner

OBJECT DETECTION SYSTEM

CROSS REFERENCE TO RELATED APPLICATIONS

This application claims the benefit of priority to Japanese Patent Application No. 2021-033499 filed on Mar. 3, 2021 and is a Continuation application of PCT Application No. PCT/JP2021/037868 filed on Oct. 13, 2021. The entire contents of each application are hereby incorporated herein by reference.

BACKGROUND OF THE INVENTION

1. Field of the Invention

The present disclosure generally relates to object detection systems, and, more particularly, to an object detection system configured to detect an object using acoustic waves.

2. Description of the Related Art

Japanese Unexamined Patent Application Publication No. 2018-105703 discloses an object detection device (object detection system). The object detection device disclosed in Japanese Unexamined Patent Application Publication No. 2018-105703 uses a plurality of ultrasound sensors for transmitting ultrasound waves from a transducer and generating a received-wave signal based on the vibration of the transducer to detect an object that is present around a mobile unit based on reflected waves (echoes) received by the ultrasound sensors (wave receivers).

SUMMARY OF THE INVENTION

A reflected wave from an object becomes larger with decreasing distance from the object and becomes smaller with increasing distance from the object. For the detection of a distant object, it is considered that the sound pressure of an ultrasound wave is made high. However, when the sound pressure of an ultrasound wave becomes high, the influence of direct sound (a direct wave) resulting from the direct entrance of an ultrasound wave generated by a transducer into an ultrasound sensor becomes large and a near object is less likely to be detected.

Preferred embodiments of the present invention provide object detection systems with each of which an object detection range can be broadened.

An object detection system according to an aspect of a preferred embodiment of the present disclosure includes an acoustic wave generator to generate an acoustic wave by generating heat upon energization and a processing circuit to perform object detection processing to detect an object in target space using an acoustic wave from the acoustic wave generator. The object detection processing includes setting processing, wave transmission processing, and determination processing. The setting processing is processing to set a search range of the object in the target space. The wave transmission processing is processing to control the acoustic wave generator to generate an acoustic wave at a target sound pressure associated with a search range set in the setting processing. The determination processing is processing to acquire, from a wave receiver configured to receive an acoustic wave from the target space, a received-wave signal representing an acoustic wave received by the wave receiver and determining whether the object is present based on the received-wave signal.

According to aspects of preferred embodiments of the present disclosure, an object detection range can be broadened.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment

1. Summarization

Figure 1:
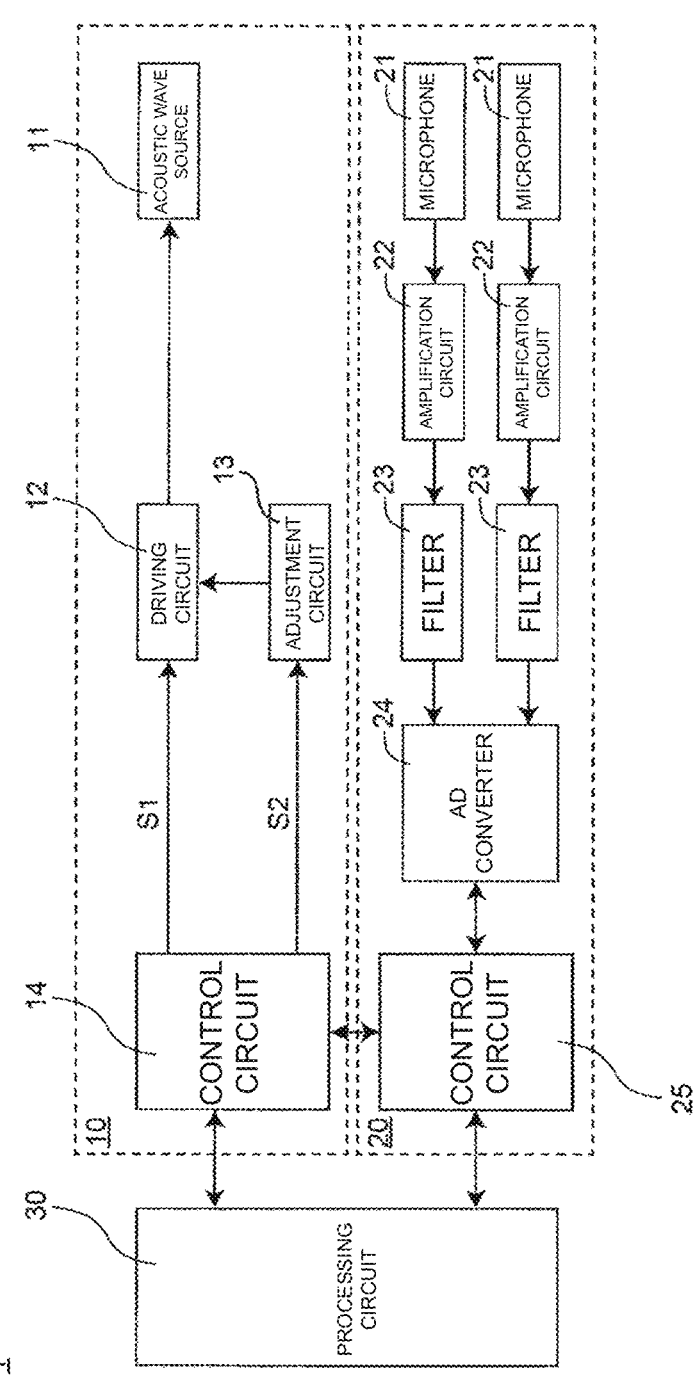
FIG. 1 is a block diagram illustrating an exemplary configuration of an object detection system according to a preferred embodiment of the present invention.

FIG. 1 is a block diagram illustrating an exemplary configuration of the object detection system 1 according to the present preferred embodiment. The object detection system 1 can detect an object in target space using acoustic waves. For example, the object detection system 1 is used in a mobile unit to detect an object such as an obstacle. Examples of a mobile unit include a vehicle such as an automobile, an unmanned plane such as a drone, and an autonomous mobile robot such as a robot cleaner.

As illustrated in FIG. 1, the object detection system 1 includes an acoustic wave generator 10 to generate an acoustic wave by generating heat upon energization and a processing circuit 30 to perform object detection processing to detect an object in target space using an acoustic wave from the acoustic wave generator 10. The object detection processing includes setting processing (S11 and S16 to S19 in FIG. 6), wave transmission processing (S12 in FIG. 6), and determination processing (S13 and S14 in FIG. 6). In the setting processing, an object search range in target space is set. In the wave transmission processing, the acoustic wave generator 10 is controlled to generate an acoustic wave at a sound pressure associated with a search range set in the setting processing. In the determination processing, a received-wave signal representing an acoustic wave received by a wave receiver 20 to receive an acoustic wave from target space is acquired from the wave receiver 20 and it is determined whether an object is present in a search range based on the received-wave signal.

The object detection system 1 illustrated in FIG. 1 can set the sound pressure of an acoustic wave to be output from the acoustic wave generator 10 to a target sound pressure associated with an object search range in target space. That is, the sound pressure of an acoustic wave can be set in accordance with a distance to an object. Accordingly, by increasing a target sound pressure, a reflected wave from an object can be made larger and a more distant object can be detected. On the there hand, by reducing a target sound pressure, the influence of direct sound on the wave receiver 20 can be reduced and a nearer object can be detected. As described above, an object detection range can be broadened by using the object detection system 1.

2. Details

The object detection system 1 will be described below with reference to drawings. As illustrated in FIG. 1, the object detection system 1 includes the acoustic wave generator 10, the wave receiver 20, and the processing circuit 30.

2-1. Acoustic Wave Generator

The acoustic wave generator 10 illustrated in FIG. 1 includes an acoustic wave source 11, a driving circuit 12, an adjustment circuit 13, and a control circuit 14.

The acoustic wave source 11 generates an acoustic wave by generating heat upon energization. More specifically, the acoustic wave source 11 is a thermal excitation element that generates an acoustic wave by heating air. The acoustic wave source 11 is a so-called thermophone. The acoustic wave source 11 includes, for example, a heating element, a substrate, a pair of electrodes, and a heat-insulating layer. A heating element is a resistance element that generates heat when a current flows therethrough. For example, a heating element is disposed on a substrate such that it is exposed to air. Air around a heating element expands or contracts in response to the change in the temperature of the heating element, so that an air pressure wave, that is, an acoustic wave, is generated. A heat-insulating layer suppresses the transfer of heat from a heating element to a substrate. A pair of electrodes is used to flow a current from the outside of the acoustic wave source 11 to a heating element. One of electrodes in a pair is provided on one side of a heating element, and the other one of them is provided on the other side of the heating element. The acoustic wave source 11 may have a configuration known in the related art, and the detailed description of the acoustic wave source 11 will be omitted.

Figure 2:
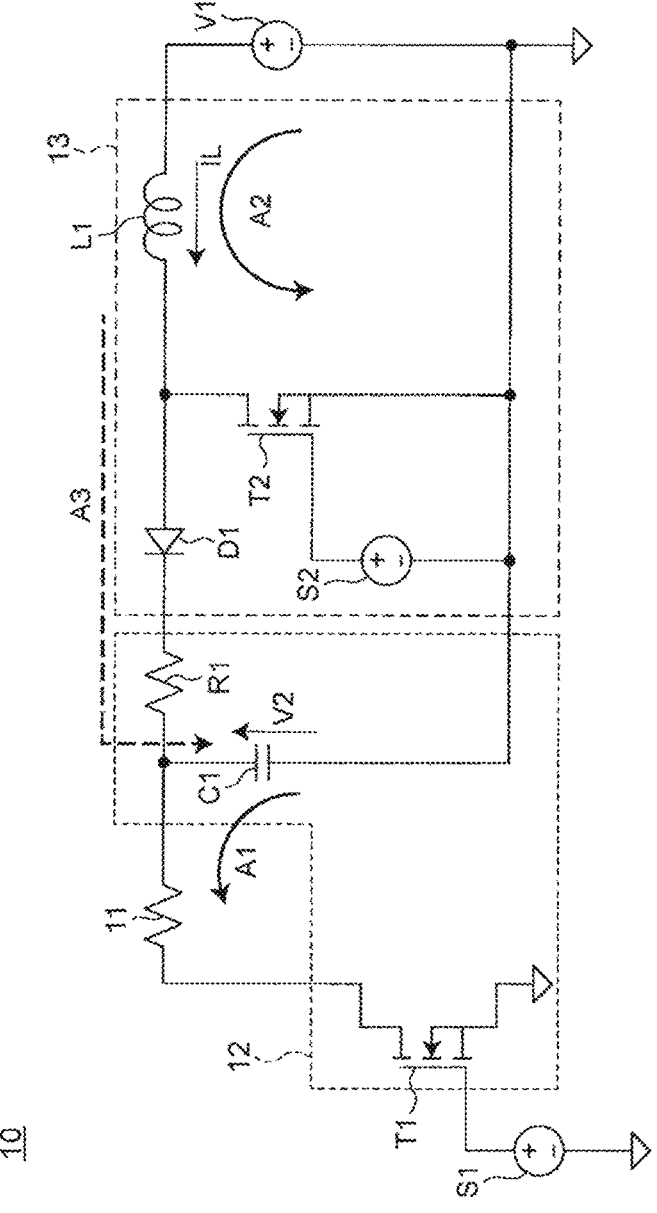
FIG. 2 is a circuit diagram illustrating an exemplary configuration of an acoustic wave generator included in the object detection system in FIG. 1.

FIG. 2 is a circuit diagram illustrating an exemplary configuration of the acoustic wave generator 10. As illustrated in FIG. 2, the acoustic wave source 11 is electrically connected between a direct-current power supply V1 and the ground.

The direct-current power supply V1 may include, for example, various power supply circuits and/or a battery. Various power supply circuits include, for example, an AC/DC converter, a DC/DC converter, a regulator, and a battery. The voltage value of the direct-current power supply V1 is, for example, about 5 V.

The driving circuit 12 supplies power to the acoustic wave source 11 to allow the acoustic wave source 11 to generate an acoustic wave. As illustrated in FIG. 2, the driving circuit 12 includes a capacitor C1, a driving switching element T1, and a resistor R1.

The capacitor C1 is used to supply power to the acoustic wave source 11. The capacitor C1 is electrically connected between the ground and the node between the direct-current power supply V1 and the acoustic wave source 11. The capacitor C1 is, for example, an electrolytic capacitor or a ceramic capacitor.

The driving switching element T1 is used to drive the acoustic wave source 11 by controlling the supply of power to the acoustic wave source 11. The driving switching element T1 is electrically connected between the acoustic wave source 11 and the ground. The driving switching element T1 is, for example, an n-type MOSFET. When the driving switching element T1 is in the ON state, power is supplied to the acoustic wave source 11. Referring to FIG. 2, a current flows from the capacitor C1 to the acoustic wave source 11 as represented by an arrow A1 and power is supplied to the acoustic wave source 11. When the driving switching element T1 is in the OFF state, power is not supplied to the acoustic wave source 11. Bringing the driving switching element T1 into the ON and OFF states allows the acoustic wave source 11 to generate an acoustic wave. In the present disclosure, "an acoustic wave" is a sinusoidal wave in a one period and "a series of acoustic waves" is a sinusoidal wave in a plurality of periods.

The resistor R1 is an overcurrent protection element electrically connected between the capacitor C1 and the direct-current power supply V1. The resistor R1 limits a current that directly flows from the direct-current power supply V1 to the acoustic wave source 11. The excessive heat generation of the acoustic wave source 11 can be prevented by using the resistor R1. The resistance value of the resistor R1 is, for example, from about 50Ω to about 5 kΩ.

In the driving circuit 12, a current flows from the capacitor C1 to the acoustic wave source 11 and power is supplied to the acoustic wave source 11. Accordingly, the sound pressure of an acoustic wave to be output from the acoustic wave source 11 depends on a voltage V2 across the capacitor C1.

The adjustment circuit 13 adjusts the sound pressure of an acoustic wave to be output from the acoustic wave generator 10 by adjusting the voltage V2 across the capacitor C1 in the driving circuit 12. As illustrated in FIG. 2, the adjustment circuit 13 includes an inductor L1, an adjustment switching element T2, and a diode D1. The inductor L1 is electrically connected between the direct-current power supply V1 and the capacitor C1. Referring to FIG. 2, the inductor L1 is electrically connected between the resistor R1 that is an overcurrent protection element and the direct-current power supply V1. The adjustment switching element T2 is electrically connected in parallel to the series circuit of the inductor L1 and the direct-current power supply V1. The adjustment switching element T2 is, for example, an n-type MOSFET. The inductor L1, the direct-current power supply V1, and the adjustment switching element T2 define a closed loop. When the adjustment switching element T2 is in the ON state, energy is stored in the inductor L1. Referring to FIG. 2, a current flows through the closed loop defined by the direct-current power supply V1, the inductor L1, and the adjustment switching element T2 as represented by an arrow A2 and energy is stored in the inductor L1. When the state of the adjustment switching element T2 is changed from the ON state to the OFF state, an induced electromotive force is generated in the inductor L1. As a result, a current flows from the inductor L1 to the capacitor C1 as represented by an arrow A3 and the capacitor C1 is charged. The adjustment circuit 13 illustrated in FIG. 2 can charge the capacitor C1 and can therefore adjust the voltage V2 across the capacitor C1. Energy to be stored in the inductor L1 is adjusted in the ON state of the adjustment switching element T2. The diode D1 is electrically connected between the inductor L1 and the capacitor C1. In particular, the anode of the diode D1 is electrically connected to the inductor L1 and the cathode of the diode D1 is electrically connected to the capacitor C1. The diode D1 reduces the possibility that a current flows from the capacitor C1 to the inductor L1 and the capacitor C1 is accidentally discharged.

The control circuit 14 is configured to control the driving circuit 12 and the adjustment circuit 13. The control circuit 14 includes, for example, an oscillator to output driving signals S1 and S2 to be described below. The control circuit 14 is, for example, an integrated circuit such as an FPGA (field-programmable gate array). The control circuit 14 controls the adjustment circuit 13 to set the voltage V2 across the capacitor C1 in the driving circuit 12 to a value corresponding to a target sound pressure while controlling the switching of the driving switching element T1 in the driving circuit 12 to allow the acoustic wave source 11 to generate an acoustic wave.

The control circuit 14 controls the switching (ON/OFF) of the driving switching element T1 in the driving circuit 12. The control circuit 14 performs an operation of causing the acoustic wave source 11 to generate an acoustic wave by controlling the driving switching element T1 in the driving circuit 12. As illustrated in FIG. 1, the control circuit 14 outputs the driving signal S1 to control the switching of the driving switching element T1. In the present preferred embodiment, the driving switching element T1 is a MOS-FET and the driving signal S1 is input to the gate of the driving switching element T1. While the driving signal S1 is at a high level, the driving switching element T1 is in the ON state. While the driving signal S1 is at a low level, the driving switching element T1 is in the OFF state. The driving signal S1 is illustrated as a direct-current power supply in FIG. 2.

The control circuit 14 controls the switching (ON/OFF) of the adjustment switching element T2 in the adjustment circuit 13. The control circuit 14 performs an operation of adjusting the voltage V2 across the capacitor C1 in the driving circuit 12 by controlling the adjustment switching element T2 in the adjustment circuit 13. As illustrated in FIG. 1, the control circuit 14 outputs the driving signal S2 to control the switching of the adjustment switching element T2. In the present preferred embodiment, the adjustment switching element T2 is a MOSFET and the driving signal S2 is input to the gate of the adjustment switching element T2. The adjustment switching element T2 is in the ON state while the driving signal S2 is at the high level. The adjustment switching element T2 is in the OFF state while the driving signal S2 is at the low level. Referring to FIG. 2, the driving signal S2 is illustrated as a direct-current power supply.

Figure 3:
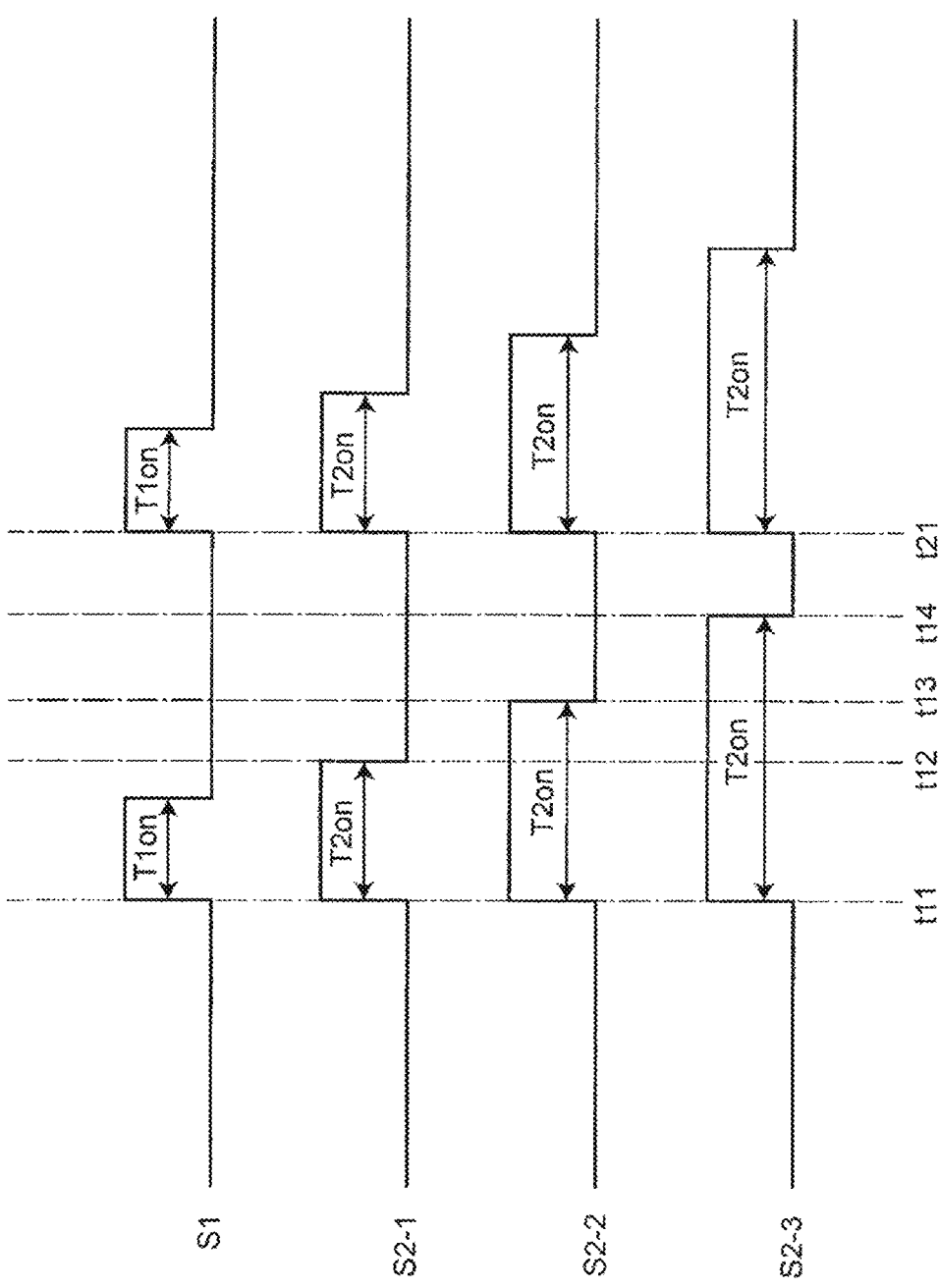
FIG. 3 is a timing chart of the operations of a driving switching element and an adjustment switching element in the object detection system in FIG. 1.

Next, the control of the driving circuit 12 and the adjustment circuit 13 performed by the control circuit 14 will be described in detail with reference to FIG. 3. FIG. 3 is a timing chart of the operation of the acoustic wave generator 10.

The control circuit 14 outputs the driving signal S1 to the driving switching element T1 to control the driving circuit 12 to cause the acoustic wave source 11 to generate an acoustic wave. As illustrated in FIG. 3, the driving signal S1 is a pulse signal (impulse signal). The pulse width of the driving signal S1 can be set to, for example, about 2 μs to about 25 μs. The pulse width of the driving signal S1 corresponds to an ON period T1on of the driving switching element T1. The ON period T1on is a period in which the driving switching element T1 is in the ON state. In the ON period T1on, a current flows from the capacitor C1 to the acoustic wave source 11 and power is supplied to the acoustic wave source 11.

In the ON period T1on, power is supplied from the capacitor C1 to the acoustic wave source 11 and an acoustic wave is output from the acoustic wave source 11. The control circuit 14 causes the adjustment circuit 13 to adjust the voltage V2 across the capacitor C1 before the start of the ON period T1on (e.g., at a time t21 in FIG. 3). The control circuit 14 outputs the driving signal S2 to the adjustment switching element T2 to control the adjustment circuit 13 to adjust the voltage V2 across the capacitor C1. In the present preferred embodiment, the adjustment switching element T2 is in the ON state in the ON period T1on of the driving switching element T1 and is turned on simultaneously with the driving switching element T1.

FIG. 3 illustrates three types of driving signals S2-1 to S2-3 as examples of the driving signal S2. As illustrated in FIG. 3, the driving signals S2-1 to S2-3 are pulse train signals. In particular, the pulse width of each of the driving signals S2-1 to S2-3 correspond to an ON period T2on of the adjustment switching element T2. In the ON period T2on, the adjustment switching element T2 is in the ON state. The ON periods T2on of the driving signals S2-1 to S2-3 are different from each other. The ON period T2on of the driving signal S2-1 is from a time t11 to a time t12, the ON period T2on of the driving signal S2-2 is from the time t11 to a time t13 later than the time t12, and the ON period T2on of the driving signal S2-3 is from the time t11 to a time t14 later than the time t13. In the ON period T2on, a current flows from the direct-current power supply V1 to the inductor L1 and energy is stored in the inductor L1. After the ON period T2on, the adjustment switching element T2 is turned off. When the adjustment switching element T2 is turned off, a current flows from the inductor L1 to the capacitor C1 and the capacitor C1 is charged. Accordingly, the voltage V2 across the capacitor C1 can be adjusted using the length of the ON period T2on. In the case of the driving signals S2-1 to S2-3, the voltage V2 across the capacitor C1 becomes the lowest by the use of the driving signal S2-1 and becomes the highest by the use of the driving signal S2-3.

As illustrated in FIG. 3, the control circuit 14 changes the state of the adjustment switching element T2 from the ON state to the OFF state before the ON period T1on of the driving switching element T1. As a result, the voltage V2 across the capacitor C1 can be set to a voltage based on the ON period T2on of the adjustment switching element T2.

2-2. Wave Receiver

The wave receiver 20 receives an acoustic wave and outputs a received-wave signal representing the received acoustic wave to the processing circuit 30. The wave receiver 20 illustrated in FIG. 1 includes a plurality of (two in the drawing) microphones 21, a plurality of (two in the drawing) amplification circuits 22, a plurality of (two in the drawing) filters 23, an AD converter 24, and a control circuit 25.

The microphone 21 is an electroacoustic transducer element to convert an acoustic wave into an electric signal. Upon receiving an acoustic wave, the microphone 21 outputs an analog received-wave signal representing the received acoustic wave. The microphone 21 is used to detect an acoustic wave that has been output from the acoustic wave source 11 and then reflected from an object. The amplification circuit 22 amplifies an analog received-wave signal from the microphone 21 and outputs the amplified signal. The filter 23 passes a signal in a pass band including the frequency band of an acoustic wave. The filter 23 is, for example, a bandpass filter. The AD converter 24 converts an analog received-wave signal that has passed through the filter 23 into a digital received-wave signal and outputs the digital received-wave signal to the control circuit 25. The microphone 21, the amplification circuit 22, the filter 23, and the AD converter 24 may have respective configurations known in the related art, and the detailed description thereof will be omitted.

The control circuit 25 controls the AD converter 24 to cause the AD converter 24 to output a digital received-wave signal to the control circuit 25. The control circuit 25 outputs a digital received-wave signal output from the AD converter 24 to the processing circuit 30. The control circuit 25 is, for example, an integrated circuit, such as an FPGA. The control circuit 14 and the control circuit 25 may be integrated into one chip. For example, the control circuit 14 and the control circuit 25 may be provided as a single FPGA.

2-3. Processing Circuit

The processing circuit 30 is a circuit to control the operation of the object detection system 1. For example, the processing circuit 30 can be formed by a computer system including one or more processors (microprocessors) and one or more memories. One or more processors execute a program to realize the function of the processing circuit 30.

The processing circuit 30 performs the object detection processing to detect an object in target space using an acoustic wave from the acoustic wave generator 10. The object detection processing includes the setting processing, the wave transmission processing, and the determination processing.

In the setting processing, an object search range in target space is set. The target space is space subjected to object detection. In the range from the minimum value to the maximum value of a distance to an object in the target space set in advance, a plurality of search ranges are set. In the present preferred embodiment, a distance to an object is, for example, a distance from the acoustic wave generator 10 to an object. The search range is a range subjected to object detection in the target space and is determined based on the range of a distance to an object. A plurality of search ranges are set in the target space as described above and are based on different ranges of a distance. A plurality of search ranges may partly overlap, but it is desired that one search range not be included in another search range. A plurality of search ranges include, for example, a first search range, a second search range, and a third search range. The first search range is nearest to the acoustic wave generator 10 of the first to third search ranges. The third search range is the farthest from the acoustic wave generator 10 of the first to third search ranges. The second search range is farther from the acoustic wave generator 10 than the first search range and is nearer to the acoustic wave generator 10 than the third search range. That is, the first search range is a short-distance search range, the second search range is a medium-distance search range, and the third search range is a long-distance search range. The short distance is, for example, the distance of a few centimeters to an object. The long distance is, for example, the distance of a few meters to an object. A method of setting a search range in the setting processing will be described below.

In the wave transmission processing, the acoustic wave generator 10 is controlled to generate an acoustic wave at a target sound pressure associated with a search range set in the setting processing. More specifically, in the wave transmission processing, the adjustment circuit 13 adjusts the voltage V2 across the capacitor C1 such that the sound pressure of an acoustic wave from the acoustic wave generator 10 becomes a target sound pressure. In the wave transmission processing, the driving switching element T1 in the driving circuit 12 is driven to cause the acoustic wave source 11 to generate an acoustic wave. In the wave transmission processing, for example, the processing circuit 30 transmits an instruction to the control circuit 14 to cause the control circuit 14 to control the driving circuit 12 and the adjustment circuit 13. The association between a search range and a target sound pressure will be described below.

In the determination processing, a received-wave signal representing an acoustic wave received by the wave receiver 20 to receive an acoustic wave from target space is acquired from the wave receiver 20. In the determination processing, for example, a digital received-wave signal is acquired from the wave receiver 20. In the case where an object is present in target space, an acoustic wave from the target space includes a reflected wave (also referred to as an echo) of an acoustic wave that has been output from the acoustic wave generator 10 and reflected from an object. In the determination processing, it is determined whether an object is present in the target space based on the acquired received-wave signal. In the present preferred embodiment, it is determined in the determination processing that an object is present when a determination value based on a received-wave signal is greater than or equal to a threshold value. A determination value is, for example, the magnitude (amplitude) of a received-wave signal. A threshold value is used for the determination of whether an acoustic wave represented by a received-wave signal includes a reflected wave. That is, the case where a determination value based on a received-wave signal is greater than or equal to a threshold value is the case where a reflected wave from an object has been detected. In the determination processing, a distance to an object is determined based on a received-wave signal when it is determined that an object is present in a search range. In the determination processing, for example, a distance to an object is determined based on a difference between a time at which the acoustic wave generator 10 has output an acoustic wave (transmission time) and a time at which a reflected wave from an object has been detected (reception time) using a TOF (time of flight) technique. The detection of an object, the measurement of a distance to an object, and the like by the use of an acoustic wave can be performed using techniques known in the related art, and the detailed description thereof will be omitted.

3. Association Between Search Range and Target Sound Pressure

Figure 4:
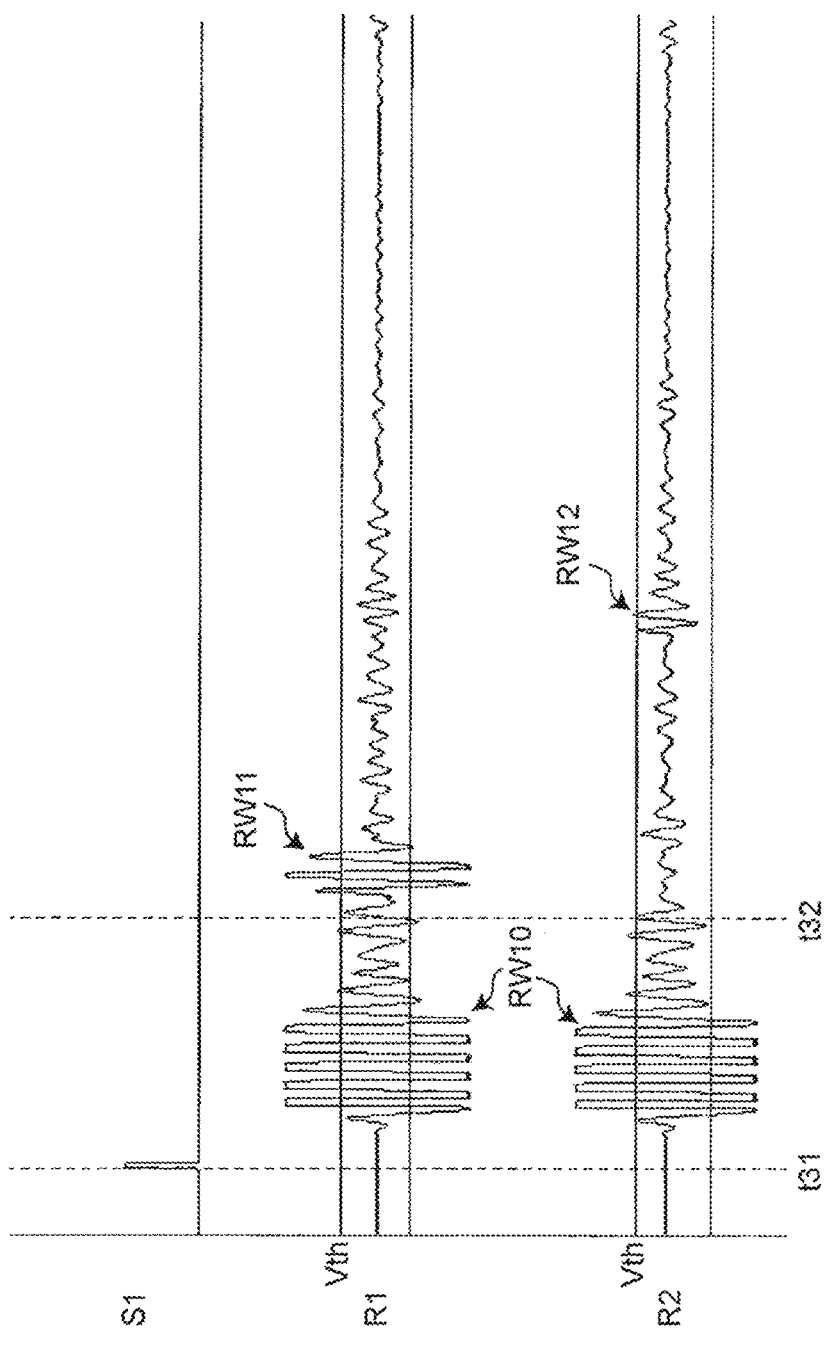
FIG. 4 is a waveform diagram illustrating the relationship between a driving signal and a received-wave signal.

FIG. 4 is a timing chart illustrating the relationship between the driving signal S1 and the received-wave signals R1 and R2 in an object detection system not including the adjustment circuit 13 which is a comparative example. Referring to FIG. 4, Vth represents a threshold value used in the determination processing. The received-wave signal R1 corresponds to the case where an object is present at a short distance, and the received-wave signal R2 corresponds to the case where an object is present at a long distance. Referring to FIG. 4, each of the received-wave signals R1 and R2 includes direct sound RW10 that is generated by the direct entrance of an acoustic wave output from the acoustic wave generator 10 in response to the driving signal S1 into the wave receiver 20. To prevent false detection due to the loudness of the direct sound RW10 exceeding the threshold value Vth, a blind spot is set. A blind spot is set after the wave transmission processing. A blind spot is, for example, a period from a time t31 at which the driving signal S1 is output to a time t32 at which the loudness of the direct sound RW10 becomes below the threshold value Vth. In the determination processing, it is not determined in a blind spot whether an object is present based on a received-wave signal. The received-wave signal R1 includes a reflected wave RW11 from a near object, and the received-wave signal R2 includes a reflected wave RW12 from a distant object. As is apparent from FIG. 4, the nearer the object is, the earlier the reception time when a reflected wave from the object is detected. In the case where a blind spot is set, the detection of an object at a distance from which a reflected wave is received at a reception time included in the blind spot cannot be performed. Accordingly, it is desiret that a shorter blind spot be set to detect a nearer object. The loudness and length of the direct sound RW10 increases with the increase in the sound pressure of an acoustic wave output from the acoustic wave generator 10. That is, the period in which the loudness of the direct sound RW10 is greater than or equal to the threshold value Vth changes in accordance with the sound pressure of an acoustic wave output from the acoustic wave generator 10. Accordingly, by reducing the sound pressure of an acoustic wave to be output from the acoustic wave generator 10 to shorten the period in which the loudness of the direct sound RW10 is greater than or equal to the threshold value Vth, a blind spot can also be shortened. To detect a near object, it is therefore desired that the sound pressure of an acoustic wave be low. As is apparent from FIG. 4, a reflected wave from an object becomes large when a distance to the object is short and becomes small when the distance to the object is long. Even if a reflected wave from an object is actually present, it is determined in the determination processing that no object is present when the magnitude of the reflected wave is below the threshold value Vth. That is, the detection of an object at a distance from which a reflected wave below the threshold value Vth is obtained cannot be performed. The magnitude of a reflected wave can be increased by increasing the sound pressure of an acoustic wave to be output from the acoustic wave generator 10. Accordingly, to detect a distant object, it is desired that the sound pressure of an acoustic wave be high. Thus, to detect a near object, it is desired that the sound pressure of an acoustic wave be low to shorten the period in which the loudness of the direct sound RW10 is greater than or equal to the threshold value Vth. On the other hand, to detect a distant object, it is desired that the sound pressure of an acoustic wave be high to increase a distance at which the magnitude of a reflected wave is greater than or equal to the threshold value Vth. In consideration of these points, a higher target sound pressure is set with increasing distance from the acoustic wave generator 10 to a search range. In the case of the first to third search ranges, the target sound pressure accosiated with the first search range is the lowest and the target sound pressure accosiated with the third search range is the highest. Since the period in which the loudness of the direct sound RW10 is greater than or equal to the threshold value Vth becomes long when a target sound pressure becomes high, a longer blind spot is set with increasing distance from the acoustic wave generator 10 to a search range. In the case of the first to third search ranges, the blind spot associated with the first search range is the shortest and the blind spot associated with the third search range is the longest.

Figure 5:
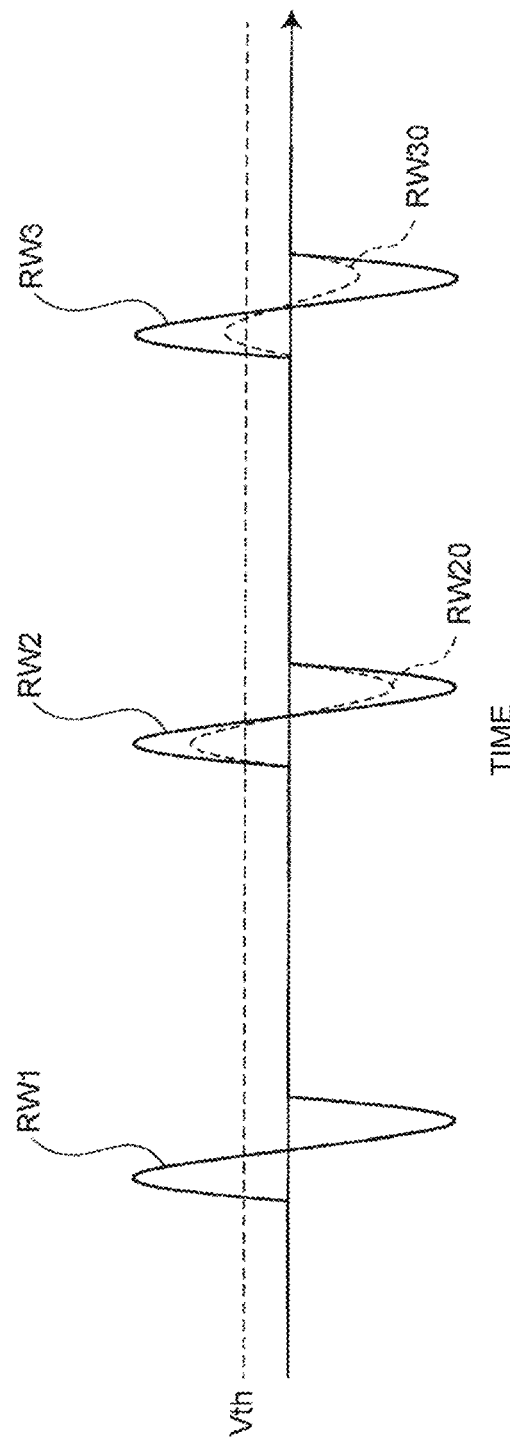
FIG. 5 is a diagram describing the magnitude of a reflected wave.

FIG. 5 is a diagram describing the magnitude of a reflected wave. In the case where an acoustic wave of a predetermined sound pressure is output from the acoustic wave generator 10, a reflected wave RW1 is obtained when an object is present in the first search range, a reflected wave RW20 is obtained when an object is present in the second search range, and a reflected wave RW30 is obtained when an object is present in the third search range. The farther the object is located from the acoustic wave generator 10, the smaller the magnitude of a reflected wave. Referring to FIG. 5, Vth represents a threshold value used in the determination processing. The magnitude of the reflected wave RW1 is sufficiently greater than the threshold value Vth, but the magnitude of the reflected wave RW30 is slightly greater than the threshold value Vth. In the case where the measurement of a distance is performed in a period from a time at which an acoustic wave is output from the acoustic wave generator 10 to a time at which a reflected wave exceeding the threshold value Vth is detected, the magnitude of a reflected wave decreases with increasing distance to an object, the influence of an error therefore increases with increasing distance to the object, and object detection accuracy decreases. In the case where the threshold value Vth is further reduced, there is a possibility that noise which is not a reflected wave is falsely detected as a reflected wave while the influence of an error can be reduced.

In the present preferred embodiment, a target sound pressure is set such that the magnitude of a reflected wave from an object is greater than or equal to a predetermined value. The predetermined value is greater than the threshold value Vth. In particular, it is desired that the predetermined value be greater than the threshold value Vth to the extent that object detection is not affected by an error. For example, the predetermined value corresponds to the magnitudes of the reflected wave RW1 from an object in the first search range in the case where an acoustic wave of a predetermined sound pressure is output from the acoustic wave generator 10. In the second search range, a target sound pressure is set such that the reflected wave RW2, the magnitude of which is the predetermined value and which is larger than the reflected wave RW20, can be obtained. In the third search range, a target sound pressure is set such that the reflected wave RW3, the magnitude of which is the predetermined value and which is larger than the reflected wave RW30, can be obtained. By setting target sound pressures for a plurality of search ranges as above, the same threshold value Vth can be used for the different search ranges. Furthermore, the influence of an error due to a distance and the possibility of false detection caused by noise can be reduced, and object detection accuracy can be improved.

4. Setting of Search Range in Setting Processing

In the setting processing, a search range to be used is selected from among a plurality of search ranges. For example, in the setting processing, a search range of a plurality of search ranges that is the nearest to the acoustic wave generator 10 is selected as an initial search range. In the setting processing, a search range is changed when it is determined in the determination processing that no object is present. In the setting processing, a search range is changed to move away from the acoustic wave generator 10 when it is determined in the determination processing that no object is present. That is, in the setting processing, the change of a search range is performed from near to far from the acoustic wave generator 10. In the case where a search range determined to include no object in the determination processing is the farthest from the acoustic wave generator 10, the change of a search range is performed such that a search range moves closer to the acoustic wave generator 10 in the setting processing. For example, the search range that is the nearest to the acoustic wave generator 10 is selected from among a plurality of search ranges in the setting processing. In the case where a distance to an object is determined in the determination processing, a search range is set in the setting processing based on the distance to an object determined in the determination processing. That is, by setting a search range based on a distance to an object, the possibility of object detection can be increased. Furthermore, tracking an object in target space can be performed.

5. Operation

Figure 6:
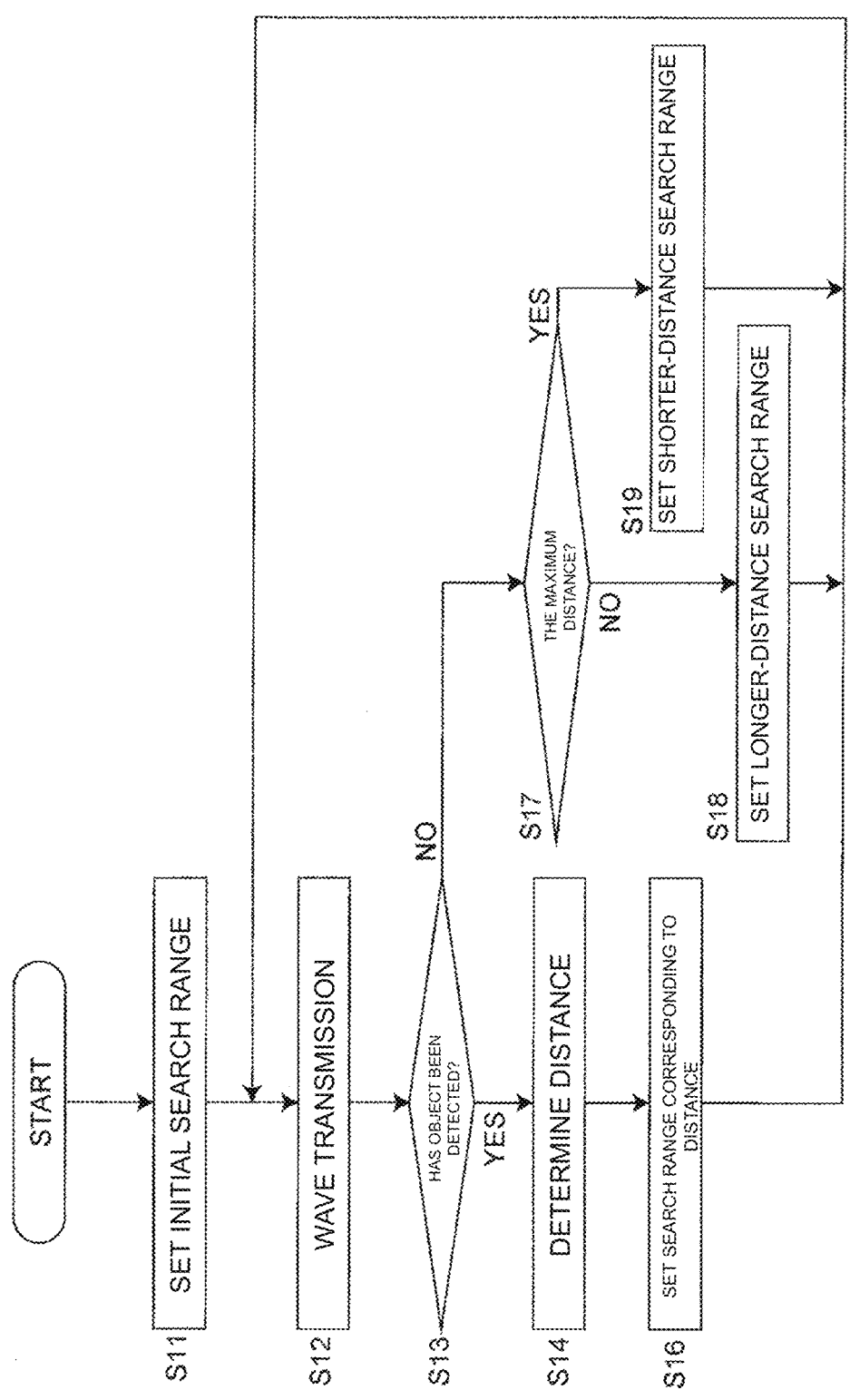
FIG. 6 is a flowchart illustrating the operation of the object detection system in FIG. 1.

Next, the operation of the object detection system 1, and, in particular, the operation of the object detection system 1 at the time of object detection processing will be described with reference to FIG. 6. In the following description, a plurality of search ranges are the above-described first to third search ranges. In the setting processing, the first search range that is the nearest to the acoustic wave generator 10 of a plurality of search ranges is selected as an initial search range (S11). In the wave transmission processing, the acoustic wave generator 10 is controlled to generate an acoustic wave at a target sound pressure associated with the first search range set in the setting processing (S12). It is determined in the determination processing whether an object is present in the first search range (S13).

In the case where an object is present in the first search range (S13; YES), a distance to the object is determined in the determination processing (S14). In the setting processing, a search range is set based on the distance to the object determined in the determination processing (S16). For example, in the setting processing, a search range including the distance to the object determined in the determination processing is selected from among the plurality of search ranges. In the wave transmission processing, the acoustic wave generator 10 is controlled to generate an acoustic wave at a target sound pressure associated with the search range set in the setting processing (S12). In the case where no object is present in the first search range (S13; NO), the change of a search range is performed in the setting processing. First, in the setting processing, it is determined whether the search range determined to include no object in the determination processing is the farthest from the acoustic wave generator 10 (S17). Since the current search range is the first search range (S17: NO), a search range is changed to move away from the acoustic wave generator 10 in the setting processing (S18). In the setting processing, a search range is changed from the first search range to the second search range. Subsequently, the pieces of processing of S12 and S13 are performed.

In the case where an object is present in the second search range (S13; YES), the pieces of processing of S14 and S16 are performed. In the case where no object is present in the second search range (S13; NO), it is determined in the setting processing whether the search range determined to include no object in the determination processing is the farthest from the acoustic wave generator 10 (S17). Since the current search range is the second search range (S17; NO), a search range is changed to move away from the acoustic wave generator 10 in the setting processing (S18).

In the setting processing, a search range is changed from the second search range to the third search range. Subsequently, the pieces of processing of S12 and S13 are performed.

In the case where an object is present in the third search range (S13; YES), the pieces of processing of S14 and S16 are performed. In the case where no object is present in the third search range (S13; NO), it is determined in the setting processing whether the search range determined to include no object in the determination processing is the farthest from the acoustic wave generator 10 (S17). Since the current search range is the third search range (S17; YES), a search range is changed to move closer to the acoustic wave generator 10 in the setting processing (S19). In the setting processing, a search range is changed from the third search range to the first search range. Subsequently, the pieces of processing of S12 and S13 are performed.

Thus, the object detection system 1 performs object detection while changing a search range in the setting processing. The object detection system 1 can set the sound pressure of an acoustic wave to be output from the acoustic wave generator 10 to a target sound pressure associated with an object search range in target space. That is, the sound pressure of an acoustic wave can be set in accordance with a distance to an object. Accordingly, by increasing a target sound pressure, a reflected wave from an object can be made larger and a more distant object can be detected. On the there hand, by reducing a target sound pressure, the influence of direct sound on the wave receiver 20 can be reduced and a nearer object can be detected. As described above, an object detection range can be broadened by using the object detection system 1.

6. Effects

The object detection system 1 described above includes the acoustic wave generator 10 configured to generate an acoustic wave by generating heat upon energization and the processing circuit 30 configured to perform object detection processing to detect an object in target space using an acoustic wave from the acoustic wave generator 10. The object detection processing includes setting processing to set a search range of the object in the target space, wave transmission processing to control the acoustic wave generator 10 to generate an acoustic wave at a target sound pressure associated with a search range set in the setting processing, and determination processing to acquire, from the wave receiver 20 configured to receive an acoustic wave from the target space, the received-wave signals R1 and R2 representing acoustic waves received by the wave receiver 20 and determining whether the object is present based on the received-wave signals R1 and R2. With this configuration, an object detection range can be broadened.

In the object detection system 1, the target sound pressure increases with increasing distance from the acoustic wave generator 10 to the search range. With this configuration, an object detection range can be broadened.

In the object detection system 1, it is determined in the determination processing that the object is present when a magnitude of the received-wave signal is greater than or equal to the threshold value $V_{th}$. With this configuration, object detection processing can be simplified.

In the object detection system 1, the target sound pressure is set such that magnitudes of the reflected waves RW1, RW2, and RW3 from the object are greater than or equal to a predetermined value greater than the threshold value $V_{th}$. With this configuration, the influence of an error due to a distance and the possibility of false detection caused by noise can be reduced, and object detection accuracy can be improved.

In the object detection system 1, in the determination processing, it is not determined whether the object is present based on the received-wave signals R1 and R2 in a blind spot set after the wave transmission processing. The blind spot is set based on a search range set in the setting processing. With this configuration, an object detection range can be broadened while false detection due to the loudness of the direct sound RW10 exceeding the threshold value Vth is prevented.

In the object detection system 1, the blind spot is set to become longer with increasing distance from the acoustic wave generator 10 to the search range. With this configuration, an object detection range can be broadened while false detection due to the loudness of the direct sound RW10 exceeding the threshold value Vth is prevented.

In the object detection system 1, in the setting processing, the search range is changed when it is determined in the determination processing that the object is not present. With this configuration, the possibility of object detection can be increased.

In the object detection system 1, in the setting processing, the search range is changed to move away from the acoustic wave generator 10 when it is determined in the determination processing that the object is not present. With this configuration, the possibility of object detection can be increased.

In the object detection system 1, in the setting processing, the search range is changed to move closer to the acoustic wave generator 10 when the search range determined not to include the object in the determination processing is the farthest from the acoustic wave generator 10. With this configuration, the possibility of object detection can be increased.

In the object detection system 1, in the determination processing, a distance to the object is determined based on the received-wave signals R1 and R2 when it is determined that the object is present. With this configuration, a distance to an object can be acquired.

In the object detection system 1, when a distance to the object is determined in the determination processing, the search range is set in the setting processing based on the distance to the object determined in the determination processing. With this configuration, the possibility of object detection can be increased.

In the object detection system 1, the acoustic wave generator 10 includes the driving circuit 12 including the capacitor C1 charged by the direct-current power supply V1 and the driving switching element T1 configured to supply power from the capacitor C1 to the acoustic wave source 11 configured to generate an acoustic wave by generating heat upon energization and the adjustment circuit 13 configured to adjust a sound pressure of an acoustic wave to be output from the acoustic wave generator 10 by adjusting the voltage V2 across the capacitor C1 in the driving circuit 12. In the wave transmission processing, the adjustment circuit 13 adjusts the voltage V2 across the capacitor C1 such that a sound pressure of an acoustic wave to be output from the acoustic wave generator 10 becomes the target sound pressure and the driving switching element T1 in the driving circuit 12 is driven to cause the acoustic wave source 11 to generate an acoustic wave. With this configuration, the sound pressure of an acoustic wave to be output from the acoustic wave generator 10 can be easily adjusted.

In the object detection system 1, the adjustment circuit 13 includes the inductor L1 electrically connected between the direct-current power supply V1 and the capacitor C1 and the adjustment switching element T2 electrically connected in parallel to a series circuit of the inductor L1 and the direct-current power supply V1. The adjustment circuit 13 adjusts the voltage V2 across the capacitor C1 in the ON period T2on of the adjustment switching element T2. With this configuration, a simple circuit configuration can be obtained.

In the object detection system 1, the adjustment circuit 13 includes the diode D1. The anode of the diode D1 is electrically connected to the inductor L1, and the cathode of the diode D1 is electrically connected to the capacitor C1. With this configuration, the possibility that a current flows from the capacitor C1 to the inductor L1 and the capacitor C1 is accidentally discharged can be reduced.

In the object detection system 1, the adjustment switching element T2 is in an ON state in the ON period T1on of the driving switching element T1 and is turned on simultaneously with the driving switching element T1. With this configuration, the sound pressure of an acoustic wave can be easily adjusted.

MODIFICATIONS

Preferred embodiments of the present disclosure are not limited to the above preferred embodiment. The above preferred embodiment can be variously modified depending on design and the like as long as the object of the present disclosure can be achieved. Modifications of the above preferred embodiment will be listed below. The modifications to be described below can be applied in appropriate combination.

1. First Modification

Figure 7:
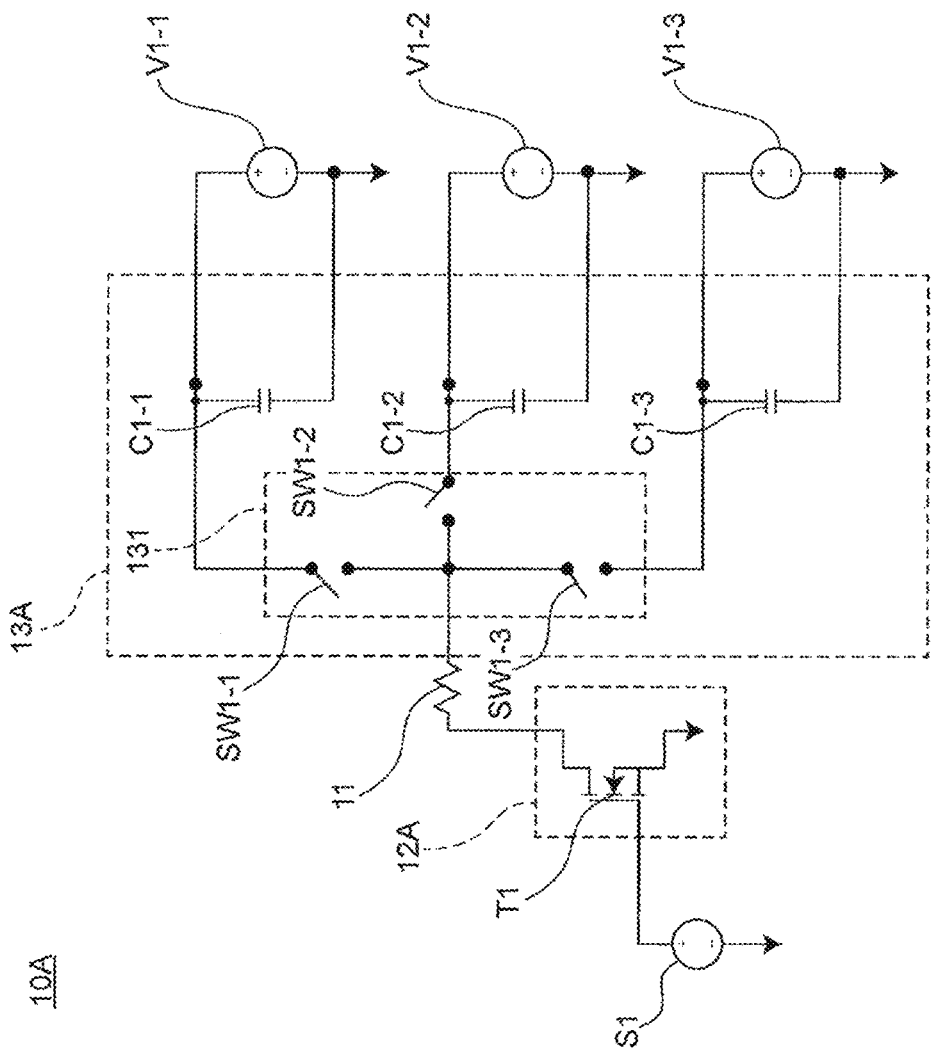
FIG. 7 is a block diagram illustrating an exemplary configuration of an acoustic wave generator that is a first modification of a preferred embodiment of the present invention.

FIG. 7 is a circuit diagram illustrating an exemplary configuration of an acoustic wave generator 10A that is the first modification. The acoustic wave generator 10A includes the acoustic wave source 11, a driving circuit 12A, and an adjustment circuit 13A. The acoustic wave generator 10A includes the control circuit 14 like the acoustic wave generator 10, but the illustration of the control circuit 14 is omitted in FIG. 7.

The driving circuit 12A includes the driving switching element T1 to supply power from a predetermined capacitor to the acoustic wave source 11 to generate an acoustic wave by generating heat upon energization. The driving switching element T1 is used to control the supply of power to the acoustic wave source 11. The driving switching element T1 is connected between the acoustic wave source 11 and the ground. When the driving switching element T1 is in the ON state, power is supplied to the acoustic wave source 11. When the driving switching element T1 is in the OFF state, power is not supplied to the acoustic wave source 11. Bringing the driving switching element T1 into the ON and OFF states allows the acoustic wave source 11 to generate an acoustic wave. The driving switching element T1 is, for example, an n-type MOSFET.

The adjustment circuit 13A adjusts the sound pressure of an acoustic wave to be output from the acoustic wave generator 10 by selecting, as a predetermined capacitor, at least one of a plurality of (three in the drawing) capacitors C1-1 to C1-3 (hereinafter collectively referred to as C1) charged by a plurality of (three in the drawing) direct-current power supplies V1-1 to V1-3 (hereinafter collectively referred to as V1) of different voltages, respectively. As illustrated in FIG. 7, the adjustment circuit 13A includes the plurality of capacitors C1-1 to C1-3 and a switching circuit 131.

The plurality of capacitors C1-1 to C1-3 are charged by the plurality of direct-current power supplies V1-1 to V1-3 of different voltages, respectively. The capacitor C1 is used to supply power to the acoustic wave source 11. The capacitor C1 is electrically connected between the ground and the node between the direct-current power supply V1 and the acoustic wave source 11. The capacitor C1 is charged by the direct-current power supply V1. The capacitor C1 is, for example, an electrolytic capacitor or a ceramic capacitor.

The switching circuit 131 selects a power supply source for the acoustic wave source 11 from among the plurality of capacitors C1. More specifically, the switching circuit 131 electrically connects at least one of the plurality of capacitors C1 to the acoustic wave source 11 to cause the acoustic wave generator 10A to generate an acoustic wave at a target sound pressure associated with a search range set in the setting processing. For example, the capacitor C1-1 and the direct-current power supply V1-1 are used to obtain the target sound pressure associated with the first search range. The capacitor C1-2 and the direct-current power supply V1-2 are used to obtain the target sound pressure associated with the second search range. The capacitor C1-3 and the direct-current power supply V1-3 are used to obtain the target sound pressure associated with the third search range.

The switching circuit 131 includes a plurality of (three in the drawing) switches SW1-1 to SW1-3 (hereinafter collectively referred to as SW1) as illustrated in FIG. 7. The plurality of switches SW1-1 to SW1-3 are electrically connected between the acoustic wave source 11 and the plurality of capacitors C1-1 to C1-3, respectively. In the switching circuit 131, one of the plurality of switches SW1-1 to SW1-3 is turned on and the remaining switches are turned off. One of the plurality of capacitors C1-1 to C1-3 is therefore electrically connected to the acoustic wave source 11.

The control circuit 14 controls the driving circuit 12A and the switching circuit 131 in the adjustment circuit 13A. To cause the acoustic wave generator 10A to generate an acoustic wave at a target sound pressure associated with a search range set in the setting processing, the control circuit 14 electrically connects at least one of the plurality of capacitors C1 to the acoustic wave source 11 by controlling the switch SW1 in the switching circuit 131.

In the case where the object detection system 1 includes the acoustic wave generator 10A, the processing circuit 30 controls the control circuit 14 in the acoustic wave generator 10A to perform wave transmission processing to be described below. In the wave transmission processing, the adjustment circuit 13A selects, as a predetermined capacitor, the capacitor C1 corresponding to a target sound pressure from among the plurality of capacitors C1 and the driving switching element T1 in the driving circuit 12A is driven to cause the acoustic wave source 11 to generate an acoustic wave.

Thus, the object detection system 1 can set the sound pressure of an acoustic wave to be output from the acoustic wave generator 10A to a target sound pressure associated with an object search range in target space. That is, the sound pressure of an acoustic wave can be set in accordance with a distance to an object. Accordingly, by increasing a target sound pressure, a reflected wave from an object can be made larger and a more distant object can be detected. On the there hand, by reducing a target sound pressure, the influence of direct sound on the wave receiver 20 can be reduced and a nearer object can be detected. As described above, an object detection range can be broadened by using the object detection system 1.

In the object detection system 1 described above, the acoustic wave generator 10A includes the driving circuit 12A including the driving switching element T1 to supply power from the predetermined capacitor C1 to the acoustic wave source 11 to generate an acoustic wave by generating heat upon energization and the adjustment circuit 13A to adjust the sound pressure of an acoustic wave to be output from the acoustic wave generator 10A by selecting, as the predetermined capacitor C1, at least one of the plurality of capacitors C1 charged by the plurality of respective direct-current power supplies V1 of different voltages. In the wave transmission processing, the adjustment circuit 13A selects, as the predetermined capacitor C1, the capacitor C1 corresponding to a target sound pressure from among the plurality of capacitors C1 and the driving switching element T1 in the driving circuit 12A is driven to cause the acoustic wave source 11 to generate an acoustic wave. With this configuration, the sound pressure of an acoustic wave to be output from the acoustic wave generator 10A can be easily adjusted.

2. Second Modification

Figure 8:
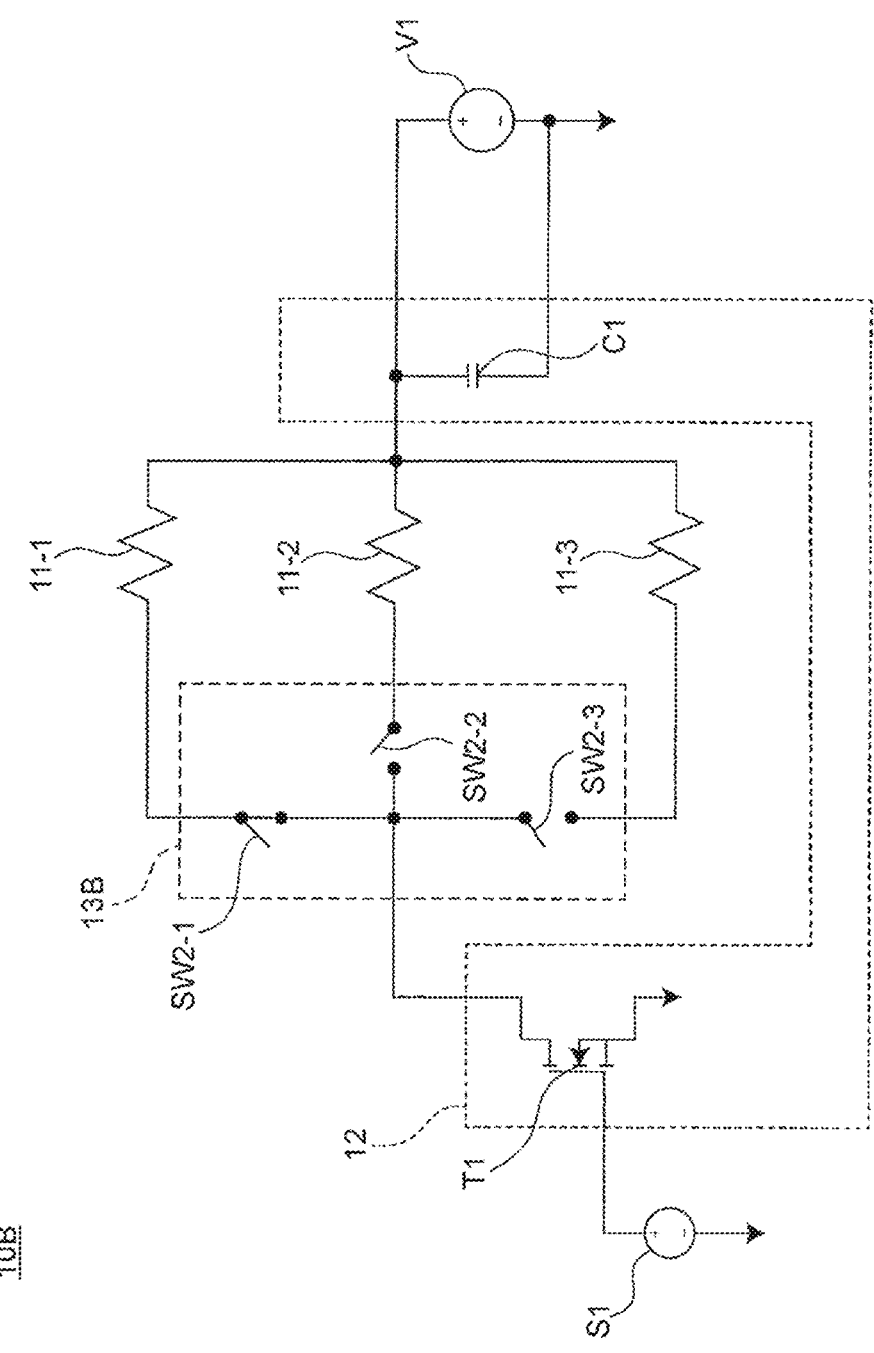
FIG. 8 is a block diagram illustrating an exemplary configuration of an acoustic wave generator that is a second modification of a preferred embodiment of the present invention.

FIG. 8 is a circuit diagram illustrating an exemplary configuration of an acoustic wave generator 10B that is the second modification. The acoustic wave generator 10B includes a plurality of (three in the drawing) acoustic wave sources 11-1 to 11-3 (hereinafter collectively referred to as 11), the driving circuit 12, and an adjustment circuit 13B. The acoustic wave generator 10B includes the control circuit 14 like the acoustic wave generator 10, but the illustration of the control circuit 14 is omitted in FIG. 8.

The plurality of acoustic wave sources 11-1 to 11-3 are electrically connected between the direct-current power supply V1 and the ground. As illustrated in FIG. 8, the plurality of acoustic wave sources 11-1 to 11-3 are connected in parallel.

The driving circuit 12 includes the capacitor C1 charged by the direct-current power supply V1 and the driving switching element T1 to supply power from the capacitor C1 to the predetermined acoustic wave source 11. The predetermined acoustic wave source 11 is selected from among the plurality of acoustic wave sources 11-1 to 11-3. The driving circuit 12 supplies power to the predetermined acoustic wave source 11 to cause the predetermined acoustic wave source 11 to generate an acoustic wave. The driving circuit 12 includes the resistor R1. The resistor R1 forms an overcurrent protection element electrically connected between the capacitor C1 and the direct-current power supply V1.

The adjustment circuit 13B adjusts the sound pressure of an acoustic wave to be output from the acoustic wave generator 10B by selecting, as the predetermined acoustic wave source 11, at least one of the plurality of acoustic wave sources 11-1 to 11-3. As illustrated in FIG. 8, the adjustment circuit 13B selects a destination to which power from the capacitor C1 is to be supplied from among the plurality of acoustic wave sources 11-1 to 11-3. More specifically, the adjustment circuit 13B electrically connects at least one of the plurality of acoustic wave sources 11-1 to 11-3 to the capacitor C1 to cause the acoustic wave generator 10B to generate an acoustic wave at a target sound pressure associated with a search range set in the setting processing. For example, the acoustic wave source 11-1 is used to obtain the target sound pressure associated with the first search range. The acoustic wave source 11-2 is used to obtain the target sound pressure associated with the second search range. The acoustic wave source 11-3 is used to obtain the target sound pressure associated with the third search range.

As illustrated in FIG. 8, the adjustment circuit 13B includes a plurality of (three in the drawing) switches SW2-1 to SW2-3 (hereinafter collectively referred to as SW2). The plurality of switches SW2-1 to SW2-3 are electrically connected between the plurality of acoustic wave sources 11-1 to 11-3 and the capacitor C, respectively. In the adjustment circuit 13B, one of the plurality of switches SW2-1 to SW2-3 is turned on and the remains of them are turned off. One of the plurality of acoustic wave sources 11-1 to 11-3 is therefore electrically connected to the capacitor C1.

The control circuit 14 controls the driving circuit 12 and the adjustment circuit 13B. To cause the acoustic wave generator 10B to generate an acoustic wave at a target sound pressures associated with a search range set in the setting processing, the control circuit 14 electrically connects at least one of the plurality of acoustic wave sources 11 to the capacitor C1 by controlling the switch SW2 in the adjustment circuit 13B.

In the case where the object detection system 1 includes the acoustic wave generator 10B, the processing circuit 30 controls the control circuit 14 in the acoustic wave generator 10B to perform wave transmission processing to be described below. In the wave transmission processing, the adjustment circuit 13B selects, as the predetermined acoustic wave source 11, the acoustic wave source 11 corresponding to a target sound pressure from among the plurality of acoustic wave sources 11 and the driving switching element T1 in the driving circuit 12 is driven to cause the predetermined acoustic wave source 11 to generate an acoustic wave.

Thus, the object detection system 1 can set the sound pressure of an acoustic wave to be output from the acoustic wave generator 10B to a target sound pressure associated with an object search range in target space. That is, the sound pressure of an acoustic wave can be set in accordance with a distance to an object. Accordingly, by increasing a target sound pressure, a reflected wave from an object can be made larger and a more distant object can be detected. On the there hand, by reducing a target sound pressure, the influence of direct sound on the wave receiver 20 can be reduced and a nearer object can be detected. As described above, an object detection range can be broadened by using the object detection system 1.

In the object detection system 1 described above, the acoustic wave generator 10B includes the plurality of acoustic wave sources 11 to generate respective acoustic waves of different sound pressures by generating heat upon energization, the driving circuit 12 including the capacitor C1 charged by the direct-current power supply V1 and the driving switching element T1 to supply power from the capacitor C1 to the predetermined acoustic wave source 11, and the adjustment circuit 13B to adjust the sound pressure of an acoustic wave to be output from the acoustic wave generator 10B by selecting at least one of the plurality of acoustic wave sources 11 as the predetermined acoustic wave source 11. In the wave transmission processing, the adjustment circuit 13B selects, as the predetermined acoustic wave source 11, the acoustic wave source 11 corresponding to a target sound pressure from among the plurality of acoustic wave sources 11 and the driving switching element T1 in the driving circuit 12 is driven to cause the predetermined acoustic wave source 11 to generate an acoustic wave. With this configuration, the sound pressure of an acoustic wave to be output from the acoustic wave generator 10B can be easily adjusted.

3. Other Modifications

In a modification, in the acoustic wave generator 10, the control circuit 14 may output the driving signal S1 to the driving switching element T1 to control the driving circuit 12 to cause the acoustic wave source 11 to generate a series of acoustic waves. The switching frequency of the driving switching element T1 corresponds to the frequency of a series of acoustic waves. For example, the switching frequency of the driving switching element T1 is greater than or equal to about 20 kHz. For example, the switching frequency of the driving switching element T1 is equal to or less than about 150 kHz.

In the first modification, the number of direct-current power supplies V1 and the number of capacitors C1 are not particularly limited. The adjustment circuit 13A may connect the two or more capacitors C1 to the acoustic wave source 11 as needed. The plurality of capacitors C1 are connected in parallel to the acoustic wave source 11 in the first modification, but may be connected in series to the acoustic wave source 11. In this case, a voltage to be applied to the acoustic wave source 11 can be adjusted by causing the switching circuit 131 to change the number of series connections of the plurality of capacitors C1. The configuration in the first modification is also applicable to the acoustic wave generator 10 and the acoustic wave generator 10B.

In the second modification, the number of acoustic wave sources 11 is not particularly limited. The adjustment circuit 13B may connect the two or more acoustic wave sources 11 to the capacitor C1 as needed. The plurality of acoustic wave sources 11 are connected in parallel to the capacitor C1 in the second modification, but may be connected in series to the capacitor C1. In this case, a sound pressure can be adjusted by causing the adjustment circuit 13B to change the number of series connections of the plurality of acoustic wave sources 11. The configuration in the second modification is also applicable to the acoustic wave generator 10 and the acoustic wave generator 10A.

In a modification, another overcurrent protection element may be used instead of the resistor R1. Examples of an overcurrent protection element include a current fuse, a fuse resistor, and bimetal. An overcurrent protection element does not necessarily have to be provided.

ASPECTS

As is apparent from the above preferred embodiments and modifications, the present disclosure includes the following aspects. In the following, reference symbols are given in parentheses only to clarify the correspondence with the preferred embodiments.

An object detection system (1) according to a first aspect of a preferred embodiment of the present invention includes an acoustic wave generator (10; 10A; 10B) to generate an acoustic wave by generating heat upon energization and a processing circuit (30) to perform object detection processing to detect an object in target space using an acoustic wave from the acoustic wave generator (10; 10A; 10B). The object detection processing includes setting processing to set a search range of the object in the target space, wave transmission processing to control the acoustic wave generator (10; 10A; 10B) to generate an acoustic wave at a target sound pressure associated with a search range set in the setting processing, and determination processing to acquire, from a wave receiver (20) to receive an acoustic wave from the target space, a received-wave signal (R1, R2) representing an acoustic wave received by the wave receiver (20) and determining whether the object is present based on the received-wave signal (R1, R2). According to this aspect, an object detection range can be broadened.

The second aspect is the object detection system (1) according to the first aspect. In the second aspect, the target sound pressure increases with increasing distance from the acoustic wave generator (10; 10A; 10B) to the search range. According to this aspect, an object detection range can be broadened.

The third aspect is the object detection system (1) according to the second aspect. In the third aspect, it is determined in the determination processing that the object is present when a magnitude of the received-wave signal (R1, R2) is greater than or equal to a threshold value (Vth). According to this aspect, object detection processing can be simplified.

The fourth aspect is the object detection system (1) according to the third aspect. In the fourth aspect, the target sound pressure is set such that a magnitude of a reflected wave (RW1, RW2, RW3) from the object is greater than or equal to a predetermined value greater than the threshold value (Vth). According to this aspect, the influence of an error due to a distance and the possibility of false detection caused by noise can be reduced, and object detection accuracy can be improved.

The fifth aspect is the object detection system (1) according to the fourth aspect. In the fifth aspect, in the determination processing, it is not determined whether the object is present based on the received-wave signal (R1, R2) in a blind spot set after the wave transmission processing. The blind spot is set based on a search range set in the setting processing. According to this aspect, an object detection range can be broadened while false detection due to the magnitude of a direct sound (RW10) exceeding a threshold value (Vth) is prevented.

The sixth aspect is the object detection system (1) according to the fifth aspect. In the sixth aspect, the blind spot is set to become longer with increasing distance from the acoustic wave generator (10; 10A; 10B) to the search range. According to this aspect, an object detection range can be broadened while false detection due to the magnitude of a direct sound (RW10) exceeding a threshold value (Vth) is prevented.

The seventh aspect is the object detection system (1) according to any one of the first to sixth aspects. In the seventh aspect, in the setting processing, the search range is changed when it is determined in the determination processing that the object is not present. According to this aspect, the possibility of object detection can be increased.

The eighth aspect is the object detection system (1) according to the seventh aspect. In the eighth aspect, in the setting processing, the search range is changed to move away from the acoustic wave generator (10; 10A; 10B) when it is determined in the determination processing that the object is not present. According to this aspect, the possibility of object detection can be increased.

The ninth aspect is the object detection system (1) according to the eighth aspect. In the ninth aspect, in the setting processing, the search range is changed to move closer to the acoustic wave generator (10; 10A; 10B) when the search range determined not to include the object in the determination processing is the farthest from the acoustic wave generator (10; 10A; 10B). According to this aspect, the possibility of object detection can be increased.

The tenth aspect is the object detection system (1) according to any one of the first to ninth aspects. In the tenth aspect, in the determination processing, a distance to the object is determined based on the received-wave signal (R1, R2) when it is determined that the object is present. According to this aspect, a distance to an object can be obtained.

The eleventh aspect is the object detection system (1) according to the tenth aspect. In the eleventh aspect, when a distance to the object is determined in the determination processing, the search range is set in the setting processing based on the distance to the object determined in the determination processing. According to this aspect, the possibility of object detection can be increased.

The twelfth aspect is the object detection system (1) according to any one of the first to eleventh aspects. In the twelfth aspect, the acoustic wave generator (10) includes a driving circuit (12) including a capacitor (C1) charged by a direct-current power supply (V1) and a driving switch (T1) to supply power from the capacitor (C1) to an acoustic wave source (11) to generate an acoustic wave by generating heat upon energization and an adjustment circuit (13) to adjust a sound pressure of an acoustic wave to be output from the acoustic wave generator (10) by adjusting a voltage (V2) across the capacitor (C1) in the driving circuit (12). In the wave transmission processing, the adjustment circuit (13) is operable to adjust a voltage (V2) across the capacitor (C1) such that a sound pressure of an acoustic wave to be output from the acoustic wave generator (10) becomes the target sound pressure and the driving switch (T1) in the driving circuit (12) is operable to be driven to cause the acoustic wave source (11) to generate an acoustic wave. According to this aspect, the sound pressure of an acoustic wave to be output from the acoustic wave generator (10) can be easily adjusted.

The thirteenth aspect is the object detection system (1) according to the twelfth aspect. In the thirteenth aspect, the adjustment circuit (13) includes an inductor (L1) electrically connected between the direct-current power supply (V1) and the capacitor (C1) and an adjustment switch (T2) electrically connected in parallel to a series circuit of the inductor (L1) and the direct-current power supply (V1). The adjustment circuit (13) is operable to adjust a voltage (V2) across the capacitor (C1) in an ON period (T2on) of the adjustment switch (T2). According to this aspect, a simple circuit configuration can be obtained.

The fourteenth aspect is the object detection system (1) according to the thirteenth aspect. In the fourteenth aspect, the adjustment circuit (13) includes a diode (D1), an anode of the diode (D1) is electrically connected to the inductor (L1), and a cathode of the diode (D1) is electrically connected to the capacitor (C1). According to this aspect, the possibility that a current flows from the capacitor (C1) to the inductor (L1) and the capacitor (C1) is accidentally discharged can be reduced.

The fifteenth aspect is the object detection system (1) according to the thirteenth or fourteenth aspect. In the fifteenth aspect, the adjustment switch (T2) is in an ON state in an ON period (T1on) of the driving switch (T1) and is turned on simultaneously with the driving switch (T1). According to this aspect, the sound pressure of an acoustic wave can be easily adjusted.

The sixteenth aspect is the object detection system (1) according to any one of the first to eleventh aspects. In the sixteenth aspect, the acoustic wave generator (10A) includes a driving circuit (12A) including a driving switch (T1) to supply power from a predetermined capacitor (C1) to an acoustic wave source (11) to generate an acoustic wave by generating heat upon energization and an adjustment circuit (13A) to adjust a sound pressure of an acoustic wave to be output from the acoustic wave generator (10A) by selecting, as the predetermined capacitor (C1), at least one of a plurality of capacitors (C1) charged by a plurality of respective direct-current power supplies (V1) of different voltages. In the wave transmission processing, the adjustment circuit (13A) selects, as the predetermined capacitor (C1), a capacitor (C1) corresponding to the target sound pressure from among the plurality of capacitors (C1) and the driving switch (T1) in the driving circuit (12A) is operable to be driven to cause the acoustic wave source (11) to generate an acoustic wave. According to this aspect, the sound pressure of an acoustic wave to be output from the acoustic wave generator (10A) can be easily adjusted.

The seventeenth aspect is the object detection system (1) according to any one of the first to eleventh aspects. In the seventeenth aspect, the acoustic wave generator (10B) includes a plurality of acoustic wave sources (11) to generate respective acoustic waves of different sound pressures by generating heat upon energization, a driving circuit (12) including a capacitor (C1) charged by a direct-current power supply (V1) and a driving switch (T1) to supply power from the capacitor (C1) to a predetermined acoustic wave source (11), and an adjustment circuit (13B) to adjust a sound pressure of an acoustic wave to be output from the acoustic wave generator (10B) by selecting, as the predetermined acoustic wave source (11), at least one of the plurality of acoustic wave sources (11). In the wave transmission processing, the adjustment circuit (13B) selects, as the predetermined acoustic wave source (11), an acoustic wave source (11) corresponding to the target sound pressure from among the plurality of acoustic wave sources (11) and the driving switch (T1) in the driving circuit (12) is driven to cause the predetermined acoustic wave source (11) to generate an acoustic wave. According to this aspect, the sound pressure of an acoustic wave to be output from the acoustic wave generator (10B) can be easily adjusted.

The eighteenth aspect is the object detection system (1) according to any one of the twelfth to seventeenth aspects. In the fifteenth aspect, in the wave transmission processing, the acoustic wave generator (10; 10A; 10B) is operable to generate a series of acoustic waves in response to switching of the driving switch (T1). A switching frequency of the driving switch (T1) is greater than or equal to about 20 kHz. According to this aspect, object detection accuracy can be improved.

The preferred embodiments and modifications thereof of the present invention are applicable to acoustic wave generators. Specifically, the preferred embodiments and modifications thereof of the present invention are applicable to object detection systems to detect an object using an acoustic wave.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An object detection system comprising:
an acoustic wave generator to generate an acoustic wave by generating heat upon energization; and a processing circuit to perform object detection processing to detect an object in target space using an acoustic wave generated by the acoustic wave generator; wherein
the acoustic wave generator generates the acoustic wave by heating a air; and
the object detection processing includes:
setting processing to set a search range of the object in the target space;
wave transmission processing to control the acoustic wave generator to generate an acoustic wave at a target sound pressure associated with a search range set in the setting processing; and
determination processing to acquire, from a wave receiver to receive an acoustic wave from the target space, a received-wave signal representing an acoustic wave received by the wave receiver and determine whether the object is present based on the received-wave signal.

2. The object detection system according to claim 1, wherein the target sound pressure increases with increasing distance from the acoustic wave generator to the search range.

3. The object detection system according to claim 2, wherein it is determined in the determination processing that the object is present when a magnitude of the received-wave signal is greater than or equal to a threshold value.

4. The object detection system according to claim 3, wherein the target sound pressure is set such that a magnitude of a reflected wave from the object is greater than or equal to a predetermined value greater than the threshold value.

5. The object detection system according to claim 4, wherein
in the determination processing, it is not determined whether the object is present based on the received-wave signal in a blind spot set after the wave transmission processing; and
the blind spot is set based on a search range set in the setting processing.

6. The object detection system according to claim 5, wherein the blind spot is set to become longer with increasing distance from the acoustic wave generator to the search range.

7. The object detection system according to claim 1, wherein, in the setting processing, the search range is changed when it is determined in the determination processing that the object is not present.

8. The object detection system according to claim 7, wherein, in the setting processing, the search range is changed to move away from the acoustic wave generator when it is determined in the determination processing that the object is not present.

9. The object detection system according to claim 8, wherein, in the setting processing, the search range is changed to move closer to the acoustic wave generator when the search range determined not to include the object in the determination processing is farthest from the acoustic wave generator.

10. The object detection system according to claim 1, wherein, in the determination processing, a distance to the object is determined based on the received-wave signal when it is determined that the object is present.

11. The object detection system according to claim 10, wherein, when a distance to the object is determined in the determination processing, the search range is set in the setting processing based on the distance to the object determined in the determination processing.

12. The object detection system according to claim 1, wherein the acoustic wave generator includes:

a driving circuit including a capacitor charged by a direct-current power supply and a driving switch to supply power from the capacitor to an acoustic wave source to generate an acoustic wave by generating heat upon energization; and an adjustment circuit to adjust a sound pressure of an acoustic wave to be output from the acoustic wave generator by adjusting a voltage across the capacitor in the driving circuit; and in the wave transmission processing:

the adjustment circuit adjusts a voltage across the capacitor such that a sound pressure of an acoustic wave to be output from the acoustic wave generator becomes the target sound pressure; and the driving switch in the driving circuit is driven to cause the acoustic wave source to generate an acoustic wave.

13. The object detection system according to claim 12, wherein the adjustment circuit includes:

an inductor electrically connected between the direct-current power supply and the capacitor; and an adjustment switch electrically connected in parallel to a series circuit of the inductor and the direct-current power supply; wherein the adjustment circuit is operable to adjust a voltage across the capacitor in an ON period of the adjustment switch.

14. The object detection system according to claim 13, wherein the adjustment circuit includes a diode;

an anode of the diode is electrically connected to the inductor; and a cathode of the diode is electrically connected to the capacitor.

15. The object detection system according to claim 13, wherein the adjustment switch is in an ON state in an ON period of the driving switch and is turned on simultaneously with the driving switch.

16. The object detection system according to claim 1, wherein the acoustic wave generator includes:

a driving circuit including a driving switch to supply power from a predetermined capacitor to an acoustic wave source to generate an acoustic wave by generating heat upon energization; and an adjustment circuit to adjust a sound pressure of an acoustic wave to be output from the acoustic wave generator by selecting, as the predetermined capacitor, at least one of a plurality of capacitors charged by a plurality of respective direct-current power supplies of different voltages; and in the wave transmission processing:

the adjustment circuit is operable to select, as the predetermined capacitor, a capacitor corresponding to the target sound pressure from among the plurality of capacitors; and the driving switch in the driving circuit is operable to be driven to cause the acoustic wave source to generate an acoustic wave.

17. The object detection system according to claim 1, wherein the acoustic wave generator includes:

a plurality of acoustic wave sources to generate respective acoustic waves of different sound pressures by generating heat upon energization;

a driving circuit including a capacitor charged by a direct-current power supply and a driving switch to supply power from the capacitor to a predetermined acoustic wave source; and an adjustment circuit to adjust a sound pressure of an acoustic wave to be output from the acoustic wave generator by selecting, as the predetermined acoustic wave source, at least one of the plurality of acoustic wave sources; and in the wave transmission processing:

the adjustment circuit is operable to select, as the predetermined acoustic wave source, an acoustic wave source corresponding to the target sound pressure from among the plurality of acoustic wave sources; and the driving switch in the driving circuit is operable to be driven to cause the predetermined acoustic wave source to generate an acoustic wave.

18. The object detection system according to claim 12, wherein in the wave transmission processing, the acoustic wave generator is operable to generate a series of acoustic waves in response to switching of the driving switch; and a switching frequency of the driving switch is greater than or equal to about 20 KHz.

19. A mobile unit comprising the object detection system according to claim 1.

20. The mobile unit according to claim 19, wherein the mobile unit is one of a vehicle, an unmanned aircraft, or an autonomous mobile robot.

* * * * *